United States Patent
Bazer-Bachi et al.

(10) Patent No.: US 9,486,767 B2
(45) Date of Patent: Nov. 8, 2016

(54) MULTI-TUBE RADIAL BED REACTOR

(71) Applicant: IFP Energies nouvelles, Rueil-Malmaison (FR)

(72) Inventors: Frederic Bazer-Bachi, Irigny (FR); Fabrice Deleau, Pierre-Benite (FR); Alexandre Pagot, ST Genis Laval (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 14/712,965

(22) Filed: May 15, 2015

(65) Prior Publication Data
US 2015/0328612 A1    Nov. 19, 2015

(30) Foreign Application Priority Data
May 16, 2014    (FR) ...................... 14 54384

(51) Int. Cl.
*B01J 8/08* (2006.01)
*B01J 8/00* (2006.01)
*B01J 8/12* (2006.01)

(52) U.S. Cl.
CPC *B01J 8/08* (2013.01); *B01J 8/006* (2013.01); *B01J 8/0015* (2013.01); *B01J 8/12* (2013.01); *B01J 2208/00752* (2013.01); *B01J 2208/00761* (2013.01); *B01J 2208/00893* (2013.01)

(58) Field of Classification Search
CPC ........... B01J 8/062; B01J 8/08; B01J 8/0015
USPC ........................................ 422/651
See application file for complete search history.

(56) References Cited

U.S. PATENT DOCUMENTS

| | | | |
|---|---|---|---|
| 2,893,950 A * | 7/1959 | Johnston | B01J 8/003 208/166 |
| 5,658,539 A | 8/1997 | Euzen et al. | |
| 8,715,584 B2 | 5/2014 | Sanchez et al. | |
| 2011/0049013 A1* | 3/2011 | Sanchez | B01J 8/003 208/134 |
| 2014/0094634 A1 | 4/2014 | Sanchez et al. | |

FOREIGN PATENT DOCUMENTS

| | | |
|---|---|---|
| EP | 0693312 A1 | 1/1996 |
| FR | 2948580 A1 | 2/2011 |
| FR | 2966751 A1 | 5/2012 |

OTHER PUBLICATIONS

Search Report dated Jan. 12, 2015 issued in corresponding application FR 1454384 (pp. 1-2).

* cited by examiner

*Primary Examiner* — Huy-Tram Nguyen
(74) *Attorney, Agent, or Firm* — Millen, White, Zelano, Branigan, P.C.

(57) ABSTRACT

The present invention concerns a radial bed reactor comprising a vessel provided with a reaction zone with a moving catalyst bed. The reactor further comprises, inside the reaction zone:
- at least two feed distribution tubes, each having a first end in communication with the feed inlet means and a second, closed end, the distribution tubes extending in a substantially vertical manner and being designed to allow the feed to pass through the reaction zone and to retain the catalysts; and
- at least two effluent collection tubes, each having a first end (14) communicating with the effluent outlet means and a second, closed end (15), the collection tubes extending in a substantially vertical manner and being designed to allow effluent to pass through the collection tube and to retain the catalysts.

16 Claims, 4 Drawing Sheets

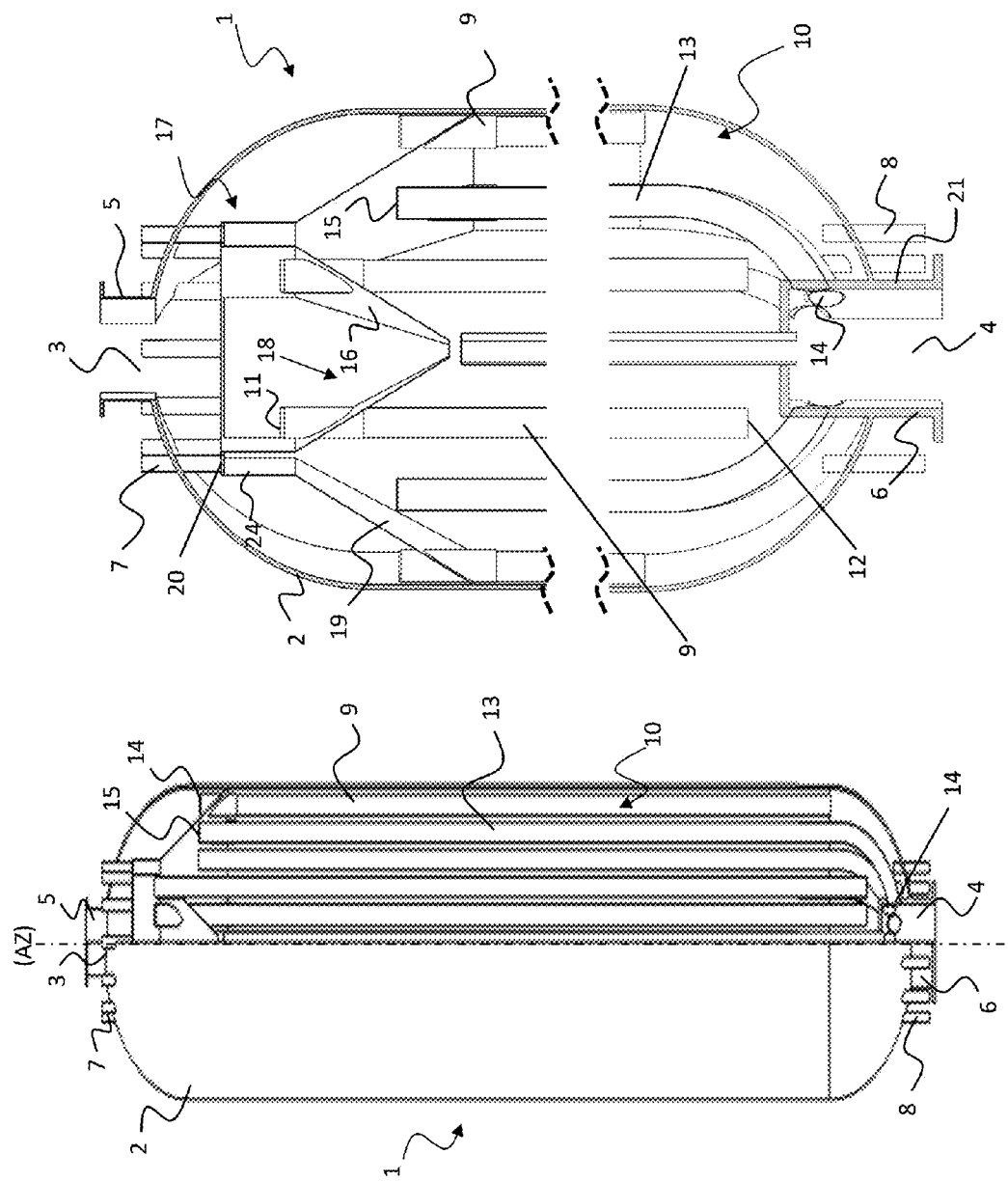

MULTI-TUBE RADIAL BED REACTOR

The present invention relates to the field of reactors for carrying out catalytic reactions, in which the bed of catalyst is mobile and in which radial movement of the feed to be treated occurs from the periphery of the vessel towards the centre or from the centre of the vessel towards its periphery. In the context of the invention, the term "radial" is used for a flow of reagents occurring through a catalytic bed, which is generally mobile, in a set of directions corresponding to radii orientated from the periphery towards the centre or from the centre towards the periphery. The present invention is of particular application to a radial flow of a reagent in the gaseous form.

PRIOR ART

The unit which is the most representative of this type of flow is a unit for regenerative reforming of gasoline type hydrocarbon cuts which may be defined as having a distillation interval in the range 80° C. to 250° C. Certain of these radial bed units, including regenerative reforming, employ a flow of catalyst said to be as a moving bed, i.e. a slow gravitational flow of the particles of catalyst confined in the annular vessel limited by an outer screen and an internal wall (for example an internal screen) corresponding to a central collector which recovers the reaction effluents.

The feed is generally introduced via the external periphery of the annular bed and passes through the catalytic bed in a manner which is substantially perpendicular to the vertical direction of flow thereof. The reaction effluents are then recovered in the central collector.

Thus, the catalytic bed is limited on the internal side by an internal screen retaining the catalyst and on the external side either by another screen of the same type as the internal screen or by a device consisting of an assembly of screen elements in the form of scallops.

The internal and external screens are porous so as to allow the feed to pass from the external screen side into the annular catalytic bed and to allow the reaction effluents to pass into the central collector from the internal screen side.

Prior art patent FR 2 948 580 is known to disclose a radial bed reactor in which the external screen is replaced by a plurality of vertical distribution tubes submerged in the catalytic bed close to the wall of the reactor. An assembly of this type has great mechanical strength, thereby allowing buckling phenomena to be reduced, and thus allowing reactor down-time linked to repair and/or replacement of said screens to be reduced.

These prior art reactors suffer from a disadvantage linked to the fact that a non-negligible portion of the volume is occupied by these internal means (screen and central collector). The catalytic volume in some cases might only be about 50% of the total volume of the vessel.

One aim of the invention is to propose a novel concept for a moving catalytic bed reactor with radial circulation in which the catalytic volume is optimized so as to improve the capacity of the reactor for the same useful volume of the reactor, and thus to increase the feed flow rate which is capable of being treated in the reactor.

SUMMARY OF THE INVENTION

To this end, a reactor is proposed which extends along a vertical axis, comprising:
a vessel provided with a reaction zone with a moving bed of catalyst;
at least one feed inlet means located above the reaction zone;
at least one outlet means for an effluent produced by the catalytic reaction, located below the reaction zone;
at least one catalyst inlet means which is capable of introducing the catalyst into an upper portion of the reaction zone;
at least one catalyst outlet means opening into a lower portion of the reaction zone; the reactor further comprising, inside the reaction zone:
at least two feed distribution tubes, each feed distribution tube having a first end in communication with the feed inlet means and a second closed end, the distribution tubes extending in a substantially vertical manner and being designed to allow the feed to pass through the reaction zone and to retain the catalysts; and
at least two effluent collection tubes, each collection tube having a first end communicating with the effluent outlet means and a second closed end, the collection tubes extending in a substantially vertical manner and being designed to allow effluent to pass through the collection tube and to retain the catalysts.

Thus, the present invention concerns a catalytic conversion reactor with a radial diffusion of the gaseous feed and with a slow gravitational flow of catalyst which includes a plurality of feed distribution tubes, which are substantially vertical, submerged in the catalytic bed and in which the central collection tube for the reaction effluents is replaced by a plurality of substantially vertical effluent collection tubes submerged in the catalytic bed.

The term "substantially vertical" means that the tubes may have an inclination in the range 0° to 15° with respect to the central vertical axis of the reactor.

An internal reactor configuration of this type can in fact be used to increase the catalytic volume for the same given useful volume of the reactor, and thus can be used to increase the flow rate of the feed to be treated and, as a consequence, can increase the capacity of the reactor for iso-reactor volume.

In other words, it is possible to envisage treating the same flow rate of feed with a reactor in accordance with the invention which has smaller dimensions compared with those of a prior art reactor.

Preferably, the number of feed distribution tubes is greater than or equal to four and the number of effluent collection tubes is greater than or equal to four.

The field of application of the reactor of the invention includes the catalytic reforming of gasolines, the skeletal isomerization of various C4, C5 olefinic cuts, or indeed the metathesis process for the production of propylene, for example. This list of processes is not exhaustive and the present invention may be applied to any type of catalytic process with a radial flow of a gaseous feed.

In accordance with one embodiment, the feed inlet means comprises an inlet tube in communication with an orifice formed in the shell of the reactor.

Preferably, the effluent outlet means comprises at least one outlet tube in communication with an orifice formed in the shell of the reactor.

In accordance with a preferred embodiment, the catalyst inlet means and the catalyst evacuation means comprise at least one tube which is open at its ends and in communication with an orifice formed in the shell of the reactor.

In a preferred embodiment, the catalyst inlet means comprises a plurality of tubes, each in communication with an orifice formed in the shell of the reactor.

In an advantageous embodiment from the point of view of robustness, the reactor comprises an upper first plate which is secured to the shell and the feed distribution tubes are supported by the first plate and each of the distribution tubes of the feed is in communication with an orifice formed in said first plate. In this embodiment, the catalyst inlet means advantageously comprise a plurality of tubes which are also supported by the first plate and each tube is in communication with an orifice formed in the first plate. As an example, the first plate is in the form of a truncated cone, preferably an inverted truncated cone, i.e. the peak of the cone is directed towards the second end of the reactor (the bottom of the reactor). The upper plate is also designed to be impermeable to the catalyst and to gases.

In accordance with a preferred embodiment, the reactor further comprises a lower second plate which is secured to the shell and the reaction zone is included between the first and second plates. The collection tubes are supported by the second plate and each collection tube is in communication with an orifice formed in the second plate. The lower plate is designed to be impermeable to catalyst and to gases.

In this embodiment, the catalyst outlet means may comprise a plurality of catalyst outlet tubes which are supported by the second plate and each of the catalyst outlet tubes is in communication with an orifice formed in the second plate and with an orifice formed in the shell.

In a preferred embodiment, the first plate and the second plate are designed to respectively obstruct the second ends of the effluent collection tubes and the second ends of the feed distribution tubes.

Advantageously, the distribution tubes and/or effluent collection tubes are removably fixed in the reactor.

In one aspect of the invention, the distribution and collection tubes are arranged in a plurality of lines of tubes in a plane perpendicular to the vertical axis. In one embodiment, each line of tubes is constituted either by distribution tubes or by collection tubes and the lines of tubes are arranged in a manner such that a line constituted by collection tubes is disposed in a manner adjacent to a line constituted by distribution tubes. In accordance with another embodiment, each line of tubes alternately comprises a distribution tube and a collection tube.

When the array of tubes comprises lines of tubes, e tubes of two adjacent lines may be disposed facing each other, i.e. in accordance with a "square" pattern. Alternatively, when the array of tubes comprises lines of tubes, the tubes of two adjacent lines may be offset, i.e. in accordance with a "triangular" pattern.

In accordance with an alternative embodiment, in a plane perpendicular to the vertical axis, the distribution and collection tubes are arranged so as to form a plurality of concentric rows and in which a row constituted by collection tubes is disposed in a manner which is adjacent to a row constituted by distribution tubes.

In accordance with another embodiment, in a plane perpendicular to the vertical axis, the distribution and collection tubes are arranged in a plurality of concentric rows and each row of tubes comprises a plurality of distribution tubes and collection tubes.

In accordance with an advantageous embodiment in terms of optimizing the use of the catalytic volume, a portion of the collection tubes and/or distribution tubes adjoin the shell of the reactor. In accordance with a particular embodiment, a portion of the collection tubes and/or distribution tubes form an integral part of the shell of the reactor.

The collection and distribution tubes may be circular, ellipsoidal or lenticular in section, or quadrilateral (for example square, rectangular or rhomboid) in shape.

When the distribution tube for the feed or the collection tube for the effluent is circular in section, it has a distribution or collection sector with an angle of opening of $\alpha$. The collection or distribution angle $\alpha$ is generally in the range 30° to 360°, and preferably in the range 180° to 360°.

When the section of the feed distribution tubes and/or effluent collection tubes is not circular in shape, the peripheral extent of the collection or distribution surface of the tubes is preferably at least 50% of the total peripheral extent of the outer section of said tube.

Preferably, the distribution and collection sectors (or distribution or collection surfaces) of the feed distribution and effluent collection tubes respectively extend over the major portion of the vertical length of the tube. The term "major portion" means a portion corresponding to at least 80% of the vertical length of the tube, preferably at least 90% of said length.

In accordance with the invention, the number of feed distribution tubes and effluent collection tubes as well as their dimensions are determined such that the mean pressure drop for the collection tubes is equal to ±20%, preferably equal to ±10% of the mean pressure drop for the distribution tubes.

DETAILED DESCRIPTION OF THE INVENTION

Other characteristics and advantages of the invention will become apparent from the following description, given by way of non-limiting illustration only, accompanied by the following drawings in which:

FIG. 1 is a partially sectional overview of a reactor in accordance with the invention;

FIG. 2 is a cross-section along the vertical axis of the reactor of FIG. 1;

In general, identical elements are denoted by the same reference numerals in the figures.

FIG. 1 shows a radial flow catalytic reactor 1 of the invention which is in the form of a carboy, formed by a shell 2 defining a cylindrical vessel which extends along a substantially vertical axis of symmetry (AZ).

Figure 4:
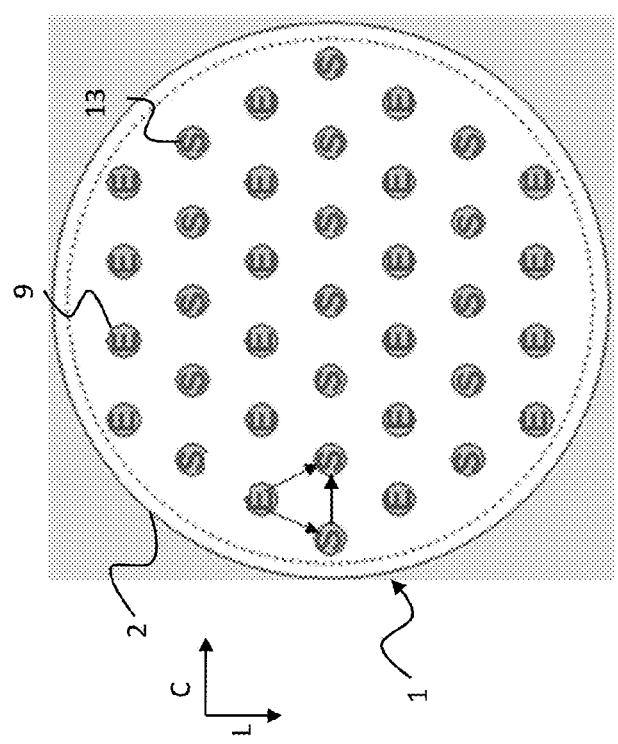
FIG. 4 is a section of the reactor in a plane perpendicular to the vertical axis showing an array of tubes in accordance with a first mode of distribution.

The shell 2 comprises, in its upper portion, a first orifice 3 and in its lower portion a second orifice 4 which are respectively the means for entry of the feed to be treated and the outlet means for the effluents produced in the catalytic reaction. The shell 2 defines a vessel which contains a reaction zone 10.

The first and second orifices 3, 4 located respectively above and below the reaction zone 10 are surrounded by a manifold 5, 6 which can be used to connect the shell to a fluid inlet and outlet pipework.

As indicated in FIG. 1, the upper portion of the shell 2 is traversed by a plurality of tubes (also known as legs) 7 for introducing catalyst which open into the upper portion of the vessel and into the reaction zone 10. The shell also comprises a plurality of tubes 8 for evacuating (or withdrawing) catalyst disposed in the lower portion of the vessel. The evacuation (or withdrawal) tubes 8 for the catalyst descend into the bottom of the reaction zone 10 and open outside the reactor 1. The catalyst which is distributed in the reaction zone 10 is in the form of particles, for example spherical, with a diameter which is generally in the range 1 to 5 mm. Clearly, the catalyst may take other forms such as, for example, cylindrical granules.

In accordance with the present invention, the reactor 1 comprises a plurality of feed distribution tubes 9 which open into the reaction zone 10. The feed distribution tubes 9 extend into the reaction zone 10 in a substantially vertical direction, preferably substantially parallel to the axis of symmetry AZ, and over at least 80% of the height of the reaction zone 10.

The feed distribution tubes 9 are open at their first end 11 which is in communication with the upper first orifice 3 of the shell of the reactor. The lower second end 12 is closed in a manner so as to prevent the feed from passing through the second end. The feed distribution tubes 9 are designed so as to be permeable to gas and impermeable to catalyst. The feed distribution tubes 9, which may be considered to be filtration devices allowing the passage of gaseous feed into the reaction zone 10 and preventing the passage of catalyst from the reaction zone 10 into the distribution tube, may, for example, be in the form of a tube provided with openings the dimensions of which are smaller than those of the catalyst particles, or in the form of a "Johnson" type screen which is known to the skilled person.

With reference to FIG. 1, the reactor 1 of the invention also comprises a plurality of collection tubes 13 for the effluent (produced by the catalytic reaction) descending in the reaction zone 10 and which extend in a substantially vertical direction, preferably substantially parallel to the axis of symmetry (AZ). The effluent collection tubes 13 are open at a first end 14 which is in communication with the second orifice 4 (effluent outlet) formed in the shell, while the second end 15 opposite to the first end 14 is closed. The effluent collection tubes 13 are designed so as to be permeable to the reaction products (reaction effluent) and impermeable to catalyst. The collection tubes, which may be considered to be filtration devices allowing the passage of effluent from the reaction zone 10 into the collection tube and preventing the passage of catalyst from the reaction zone 10 into the collection tube, may, for example, be in the form of a tube formed by a sheet and provided with openings the dimensions of which are less than the size of the catalyst particles, or indeed in the form of a "Johnson" type screen which is known to the skilled person.

FIG. 2 is a view of the interior of the reactor of FIG. 1, showing the upper and lower portions of the reactor in detail.

It will be observed in FIG. 2 that the upper portion of the reactor 1 is provided with an upper plate 16 which is secured to the shell 2. Thus, the reservoir is divided into two zones, namely:
- a zone 17 for confining the feed located above the upper plate 16, included between the shell 2 and the upper plate 16; and
- a reaction zone 10 located below the upper plate 16 and extending to the bottom of the reactor.

The upper plate 16 is constituted by a material which is impermeable to particles of catalyst and also to gases moving in the confinement zone 17 and the reaction zone 10.

As shown in FIG. 2, the feed distribution tubes 9 are supported by the upper plate 16 and pass through it in a manner such that their free open first end 11 opens into the feed confinement zone 17.

It will also be noted that the catalyst introduction legs 7 are supported by the upper plate 16 and are arranged in a manner such that their open free end opens into the upper portion of the reaction zone 10 located below the upper plate 16.

FIG. 2 also shows that the upper plate 16 comprises an inverted truncated cone portion 18 (i.e. the peak of the cone is directed towards the bottom of the reactor) the circular base of which has a diameter which is smaller than that of the vessel, and a circular skirt 19 which provides the connection between the truncated conical portion 18 and the shell 2. The circular skirt 19 is inclined downwardly in the direction of the bottom of the reactor 1. It will also be seen that the base of the cone is connected to the circular skirt 19 by means of an annular flat section 20 which is traversed by the catalyst distribution tubes 7 the open end of which opens into the reaction zone 10.

As indicated in FIG. 2, viewed in section, the skirt 19 also comprises an annular portion 24 extending along the vertical axis and connected to the flat section 20. As can be seen in FIG. 2, the upper portion of the reaction zone 10 thus comprises a first cylindrical annular zone extended by a second annular zone with an essentially truncated conical section with a dimension which is greater than the first annular zone. The catalyst which is introduced via the distribution legs 7 passes into the first cylindrical annular section and is then dispersed into the second annular truncated conical zone.

In the context of the invention and alternatively, the skirt 19 may extend in an essentially horizontal plane, i.e. perpendicular to the vertical axis (AZ).

Clearly, the upper plate 16 may have other configurations such as, for example, a disk which comprises orifices through which the catalyst distribution tubes and the feed distribution tubes are passed.

Referring still to FIG. 2, effluent collection tubes 13 are disposed in the reaction zone 10 located below the upper plate 16. The collection tubes 13 comprise an open lower first end 14 which is in communication with the effluent outlet orifice 4, and a closed upper second end 15. Advantageously from the point of view of mechanical maintenance, the second end 15 is securely attached to the upper plate 16, preferably removably in order to allow ready replacement of the tube. In the exemplary embodiment of FIG. 2, the lower end 14 of the collection tubes 13 is fixed to the shell 2 by means of a central tube 21 forming an integral part of the shell 2 and which extends in a lower portion of the reaction zone 10. Advantageously, in order to facilitate the mounting of the collection tubes 13 on the shell, the lower portion of the collection tubes 13 is bent so as to follow the bulged lower portion of the shell 2 of the reactor 1.

Figure 3:
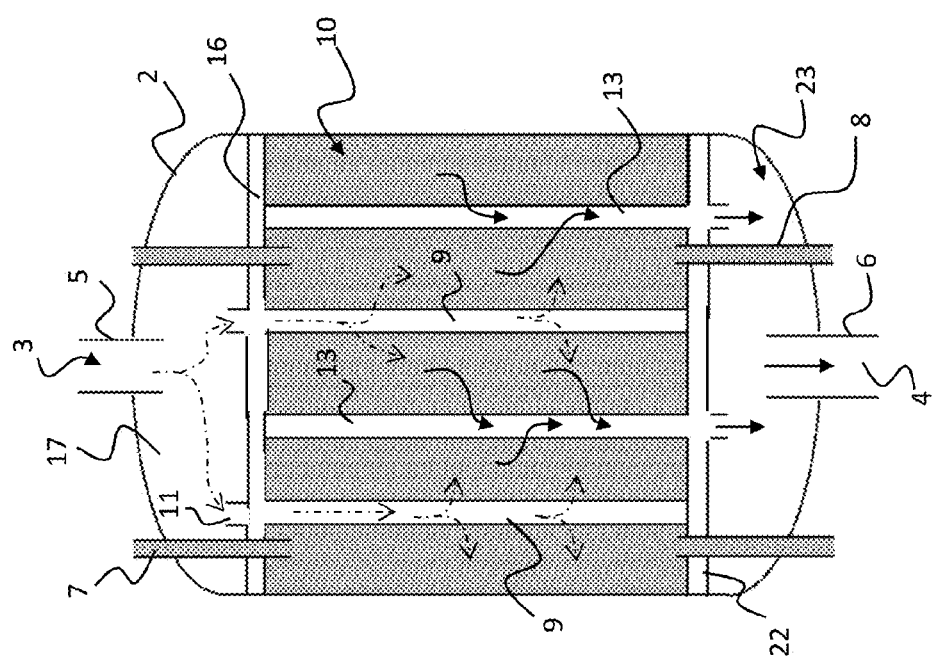
FIG. 3 is a cross-section along the vertical axis of a reactor in accordance with the invention.

An alternative embodiment of a reactor in accordance with the invention is shown diagrammatically in FIG. 3, which is a cross-sectional view in a plane parallel to the axis of symmetry (AZ) of the reactor 1.

The reactor of FIG. 3 comprises a first upper circular plate 16 and a second lower circular plate 22 which are fixed to the shell 2. The second plate is produced from a material which is impermeable to catalyst and to gases. The reaction zone 10 in which the catalyst and the feed are confined is defined by the volume of the vessel included between the first and second plates 16, 22. In this embodiment, it will be noted that advantageously, the second ends of the feed distribution tubes 9 and the effluent collection tubes 13 are obstructed respectively by the second plate 22 and by the first plate 16. Preferably, said tubes are removably fixed to said plates.

The principle of operation of the moving catalyst bed reactor of the invention will now be described with reference to FIG. 3.

The gaseous hydrocarbon feed is sent to the reactor 1 through the upper orifice 3 via the injection manifold 5 and fills the feed confinement volume 17 defined by the shell and the upper plate 16. The feed is supplied to the reaction zone 10 by means of vertical distribution tubes 9 via the upper opening 11 opening into the feed confinement zone 17. The feed passes through the distribution tubes 9 and diffuses radially through the distribution tubes which are permeable to gaseous fluid and impermeable to the particles of catalyst in the reaction zone 10.

Regarding the catalyst, this is continuously fed under gravity at a relatively low speed (of the order of one meter per hour) to the reaction zone 10 via the catalyst distribution tubes (or legs) 7 the free ends of which open into the reaction zone 10. The catalyst thus fills the reaction zone 10 and is also continuously withdrawn from the reaction zone 10 and evacuated from the reactor via catalyst outlet tubes (or legs) 8. The catalyst, which then distributes itself in a uniform manner to occupy the volume of the reaction zone 10, comes into contact with the feed in order to carry out the catalytic conversion reaction and produce a reaction effluent. The reaction effluent is collected in the effluent collection tubes 13, which are permeable to the reaction effluent and impermeable to catalyst. As indicated by the solid arrows in FIG. 3, the effluent diffuses radially through the effluent collection tubes 13 and is fed through the lower plate 22 into an effluent confinement space 23 located below the lower plate. The effluent is evacuated from the reactor via the effluent outlet orifice 4 via the outlet manifold 6 which is in communication with the effluent confinement space 23.

FIG. 4 illustrates a first example of a mode of distribution for the effluent collection tubes 13 and the feed distribution tubes 9 in the reactor. Referring to FIG. 4, which is a sectional view in a plane perpendicular to the vertical axis of the reactor, the collection tubes and distribution tubes are disposed in an array constituted by lines of tubes. In the example of FIG. 4, the array comprises a plurality of lines constituted by feed distribution tubes (E) and a plurality of lines constituted by collection tubes (S); a line constituted by collection tubes is disposed adjacent to a line constituted by distribution tubes.

Figure 5:
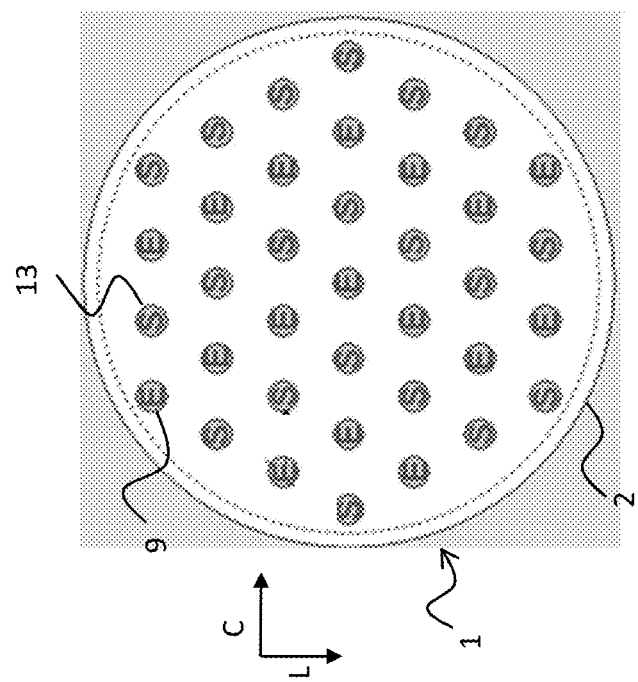
FIG. 5 is a section in a plane perpendicular to the vertical axis of the reactor showing a network of tubes in accordance with a second mode of distribution.

FIG. 5 represents another mode of distribution for the effluent collection tubes and feed distribution tubes, in which the collection and distribution tubes are disposed so as to form an array of lines of tubes. The arrangement of FIG. 5 is characterized in that each line of tubes comprises alternating feed distribution tubes (E) and an effluent collection tubes (S).

In the context of the invention and in the case in which the effluent collection tubes and feed distribution tubes are distributed in lines, the tubes of two adjacent lines may be disposed either face to face, forming a square pattern, or offset to form a triangular pattern, as can be seen in FIG. 4 or FIG. 5.

Figure 6:
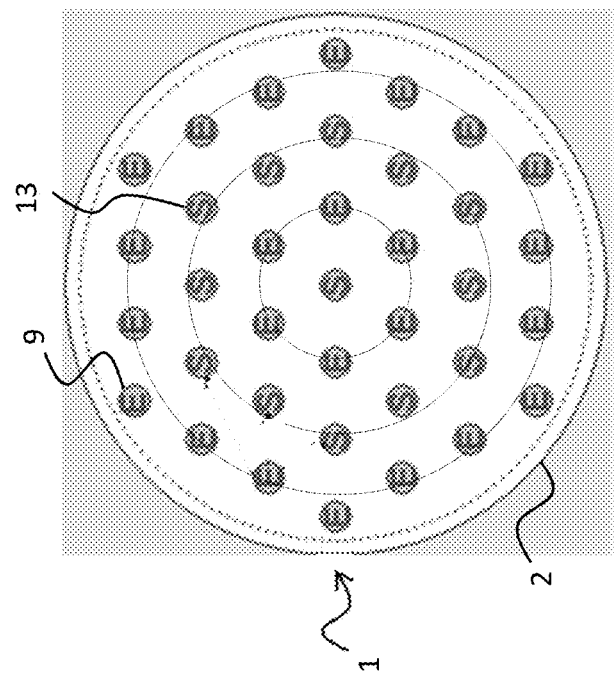
FIG. 6 is a section in a plane perpendicular to the vertical axis of the reactor showing a network of tubes in accordance with a third mode of distribution.

In accordance with another mode of distribution for the effluent collection tubes and feed distribution tubes represented in FIG. 6, the tubes are arranged on a plurality of approximately concentric rows alternately constituted by effluent collection tubes (S) and feed distribution tubes (E). The term "approximately concentric" means that the centres of all of the rows are contained in a circle centred on the centre of the vessel.

In the case of a configuration in concentric rows of tubes, it is also possible to alternate effluent collection tubes (S) and feed distribution tubes (E) successively in the same row.

Preferably, when the feed distribution tubes and the effluent collection tubes have a circular section, they respectively have an angular diffusion sector and an angular collection sector with an angle of opening a which is generally in the range 30° to 360°, preferably in the range 180° to 360°.

When the section of the distribution feed tubes and/or effluent collection tubes is not circular in shape, the peripheral extent of the collection surface or distribution surface of the tubes is preferably at least 50% of the total peripheral extent of the outer section of the tube.

In accordance with another particular feature of the present invention, the angular sector (or surface) of the distribution and/or collection tubes is produced by means of a "Johnson" type screen. In accordance with another embodiment, the distribution and/or collector sector (or surface) of the tubes is produced by means of orifices distributed in the wall of said sector, the diameter of the orifices being in the range 0.3 to 0.8 dp, where dp designates the minimum diameter of the catalyst grains. The term "minimum diameter" means the minimum distance measured between two opposite points taken on the catalyst.

It should be noted that it is also possible to adjoin a portion of the tubes (effluent collection tube and/or feed distribution tube) to the shell in order to maximize the useful catalytic volume of the reaction zone. In another alternative, a portion of the tubes forms an integral part of the shell.

Still within the context of the invention, the section of the tubes may be different from a circular section, for example square, rectangular, triangular or elliptical.

In order to provide the tubes with mechanical strength, it is possible to further provide connecting means between the tubes, for example bars, which are secured to said tubes, for example by welding. The retaining bars may advantageously be secured to the shell.

By way of non-limiting example, a reactor in accordance with the invention has the following characteristics:
  internal diameter of the reaction zone in the range 1.5 to 6 m
  internal diameter of the tubes in the range 0.1 to 0.6 m
  distance between two adjacent tubes in the range 0.2 to 0.9 m.

The number of feed distribution tubes and effluent collection tubes as well as their dimensions are determined such that the mean pressure drop for the collection tubes is equal to ±20%, preferably to ±10% of the mean pressure drop of the distribution tubes.

It is possible to add a pressure drop generator element, for example a perforated screen, to the distribution or collection tubes in order to guarantee a uniform diffusion of fluid over the entire height of the tubes.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 14/54.384, filed May 16, 2014 are incorporated by reference herein.

EXAMPLE

The example described below compares the dwell time (DTS) distributions by simulation in reactors in accordance with the prior art and in accordance with the invention. Thus, it is possible to obtain a distribution of the dwell times for each of the two reactors which in particular can be characterized by the mean dwell time for the feed in the reactor, which variable is directly correlated with the conversion of the feed.

The "prior art" reactor had an internal diameter of 2.8 m. The vessel comprised a catalytic bed in the form of a vertical cylindrical ring limited on the internal side by an internal cylindrical screen retaining the catalyst and on the external side by a cylindrical screen of the same type as the internal screen. After passing through the catalytic bed, the reaction effluents were collected in a vertical cylindrical collector through the internal screen retaining the catalyst.

The diameter of the external screen was 2.4 m and the diameter of the internal screen was 0.9 m. The screens had an effective height of 9 m.

In the reactor of the invention, the external and internal screens were replaced by tubes with a diameter of 0.19 m with a triangular pitch of 0.52 m between the tubes. The diameter was the same for the collection tubes and the distribution tubes. This reactor comprised nineteen tubes located in the catalytic bed and an equivalent of 7 tubes adjoining the shell.

Six of the tubes located in the bed as well as all of the tubes adjoining the shell were injection tubes (equivalent to 13 tubes). The other tubes (13 remaining in the catalytic bed) were collection tubes. Finally, the internal diameter of the reactor was still equal to 2.8 m and the effective height of the tubes was 9 m.

For the simulation with the prior art reactor, the nominal flow rate of the gaseous feed passing into the reactor was 120 t/h, assuming that the density of the feed was a mean of 1.8 kg/m$^3$ and the viscosity was $2\times10^{-5}$ Pa·s. The catalyst was assumed to be in the form of a grain with a diameter of 2 mm and with a void fraction between the grains equal to 41%. The same data were used for the simulation of the reactor in accordance with the invention, with the exception that the feed flow rate was increased by 38%.

For each of the two reactors, the dwell time distributions were obtained numerically using COMSOL Multiphysics 4.2a software. The feed was sent to the reactor at time t=0 and the feed flow rate was then maintained over time.

The simulations show that the mean pressure drops in the distribution tubes (10 mbar) and in the collection tubes (9 mbar) were effectively very close (10% difference).

Figure 7:
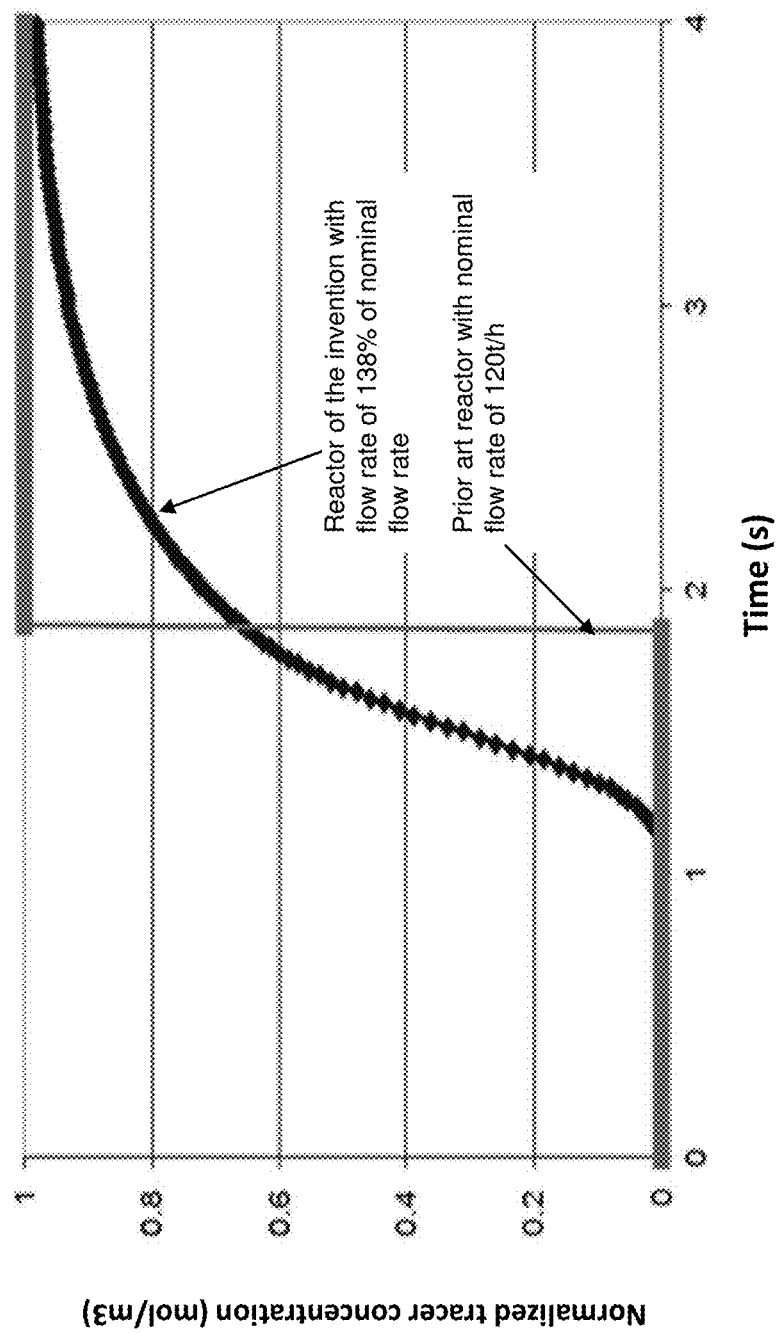
FIG. 7 is a graph of the distribution of the dwell times for a prior art reactor and a reactor in accordance with the invention.

The DTS simulations also showed that the mean feed dwell time in the prior art reactor and in the reactor in accordance with the invention in which the nominal feed flow rate had been increased by 38% was identical (FIG. 7). In other words, for the same reactor size, the reactor of the invention could be used to process a feed flow rate increased by 38%, at iso-conversion of the feed (same dwell time).

Thus, because of the design of the reactor in accordance with the invention, it is possible to increase the flow rate of feed at iso-reactor volume and thus to improve the productivity of the reactor.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reactor (1) extending along a vertical axis, comprising:
   a vessel provided with a reaction zone (10) with a moving bed of catalyst;
   at least one feed inlet means located above the reaction zone (10);
   at least one outlet means for an effluent produced by catalytic reaction, located below the reaction zone (10);
   at least one catalyst inlet means (7) which is capable of introducing catalyst into an upper portion of the reaction zone (10);
   at least one catalyst outlet means (8) opening into a lower portion of the reaction zone (10);
   the reactor further comprising, inside the reaction zone (10):
   at least two feed distribution tubes (9), each feed distribution tube (9) having a first end (11) in communication with said at least one feed inlet means and a second closed end (12), the feed distribution tubes (9) extending in a substantially vertical manner and being designed to allow feed to pass through the reaction zone (10) and to retain the catalyst; and
   at least two effluent collection tubes (13), each effluent collection tube (13) having a first end (14) communicating with said at least one outlet means and a second closed end (15), the effluent collection tubes (13) extending in a substantially vertical manner and being designed to allow effluent to pass through the collection tube (13) and to retain the catalyst.

2. The reactor according to claim 1, in which the reactor (1) is formed by a shell (2) and said at least one feed inlet means comprises an inlet tube (5) in communication with an orifice (3) formed in the shell (2).

3. The reactor according to claim 1, in which the reactor (1) is formed by a shell (2) and said at least one outlet means comprises an outlet tube (6) in communication with an orifice (4) formed in the shell (2).

4. The reactor according to claim 1, in which the reactor (1) is formed by a shell (2) and in which said at least one catalyst inlet means (7) and said at least one catalyst outlet means (8) each comprise at least one tube which is open at its ends and said tube is in communication with an orifice formed in the shell (2).

5. The reactor according to claim 1, in which the reactor (1) is formed by a shell (2) and comprises an upper first plate (16) which is secured to the shell (2) and in which the feed distribution tubes (9) are supported by the upper first plate (16) and each of the feed distribution tubes (9) and said at least one catalyst inlet means (7) are each in communication with an orifice formed in the upper first plate (16).

6. The reactor according to claim 5, in which the upper first plate (16) is in the shape of a truncated cone.

7. The reactor according to claim 5, in which the reactor further comprises a lower second plate (23) which is secured to the shell (2) and the reaction zone (10) is defined between the upper first plate and the lower second plate, and in which the effluent collection tubes (13) are supported by the lower second plate (23) and each of the effluent collection tubes (13) and said at least one catalyst outlet means (8) are each in communication with an orifice formed in the lower second plate (23).

8. The reactor according to claim 7, in which the upper first plate (16) and the lower second plate (23) respectively obstruct the second ends (15) of the effluent collection tubes (13) and the second ends (12) of the feed distribution tubes (9).

9. The reactor according to claim 1, in which said reactor has a vertical axis, and the feed distribution tubes (9) and the effluent collection (13) tubes are arranged in a plurality of lines of tubes in a plane perpendicular to the vertical axis of said reactor, in which each line of tubes is constituted by feed distribution tubes or by effluent collection tubes and in which a line constituted by effluent collection tubes (13) is disposed in a manner adjacent to a line constituted by feed distribution tubes (9).

10. The reactor according to claim 1, in which said reactor has a vertical axis, and the feed distribution tubes (9) and the effluent collection tubes (13) are arranged in a plurality of lines of tubes in a plane perpendicular to the vertical axis of said reactor, in which each line of tubes comprises, in alternation, a feed distribution tube (9) and an effluent collection tube (13).

11. The reactor according to claim 9, in which the tubes of two adjacent lines are disposed facing each other, forming a square pattern.

12. The reactor according to claim 9, in which the tubes of two adjacent lines are disposed in a manner which is offset from each other, forming a triangular pattern.

13. The reactor according to claim 1, in which said reactor has a vertical axis, and the distribution tubes (9) and collection tubes (13) are arranged in a plurality of concentric rows of tubes in a plane perpendicular to the vertical axis of said reactor, and in which a row constituted by effluent collection tubes (13) is disposed in a manner adjacent to a row constituted by feed distribution tubes(9).

14. The reactor according to claim 1, in which said reactor has a vertical axis, and the feed distribution tubes (9) and the effluent collection tubes (13) are arranged in a plurality of concentric rows of tubes in a plane perpendicular to the vertical axis of said reactor, and in which each row of tubes comprises feed distribution tubes (9) and effluent collection tubes (13).

15. The reactor according to claim 1, in which the feed distribution tubes and/or effluent collection tubes (9, 13) adjoin the shell (2) of the reactor.

16. The reactor according to claim 1, in which the effluent collection tubes (13) and feed the distribution tubes (9) are circular, ellipsoidal or lenticular in section or quadrilateral in shape.

* * * * *